US012809601B2

(12) United States Patent
Mishra et al.

(10) Patent No.: US 12,809,601 B2
(45) Date of Patent: Nov. 24, 2026

(54) INTELLIGENT METHOD TO ORCHESTRATE AND CONTROL DYNAMICALLY GENERATED USER INTERFACE ("UI") FOR SOURCE APPLICATION

(71) Applicant: Bank of America Corporation, Charlotte, NC (US)

(72) Inventors: Amit Mishra, Chennai (IN); Krithika Viswanathan, Chennai (IN); Nandini Rathaur, Mumbai (IN); Siva Kesava Makam, Hyderabad (IN); Shiva Prasad S, Chennai (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 341 days.

(21) Appl. No.: 18/668,953

(22) Filed: May 20, 2024

(65) Prior Publication Data

US 2025/0355646 A1 Nov. 20, 2025

(51) Int. Cl.
*G06F 8/38* (2018.01)
*G06F 8/35* (2018.01)

(52) U.S. Cl.
CPC . *G06F 8/38* (2013.01); *G06F 8/35* (2013.01)

(58) Field of Classification Search
CPC .................................... G06F 8/38; G06F 8/35
See application file for complete search history.

(56) References Cited

U.S. PATENT DOCUMENTS

2014/0089824 A1* 3/2014 George ............... G06F 11/3438 715/762
2020/0133641 A1* 4/2020 Sinn ........................ G06F 9/453
2020/0319872 A1* 10/2020 Yu ........................... H04L 67/34
2022/0229525 A1* 7/2022 Barak ................... G06F 3/0484
2026/0148251 A1* 5/2026 Trevino Rojas ....... G06Q 40/00

FOREIGN PATENT DOCUMENTS

AU 2022200637 2/2022

* cited by examiner

*Primary Examiner* — Anil K Bhargava
(74) *Attorney, Agent, or Firm* — Weiss & Arons LLP

(57) ABSTRACT

A method for dynamically generating a user interface ("UI"), the UI for use with a source application is provided. The method may include tagging each field within the source application to one or more priority levels. The method may include identifying a user accessing the source application. The method may include identifying a user priority level and a plurality of historic pattern behaviors of the user. The method may include generating the UI based on the user priority level and the plurality of historic pattern behaviors. The method may include dynamically monitoring the user's usage. The method may adjust the UI based on the usage. The generating the UI may include adding each field tagged to the user priority level and adding each field associated with the historic pattern behaviors to the UI. The adjusting may include adding, removing and changing at least one field generated on the UI.

11 Claims, 7 Drawing Sheets

INTELLIGENT METHOD TO ORCHESTRATE AND CONTROL DYNAMICALLY GENERATED USER INTERFACE ("UI") FOR SOURCE APPLICATION

FIELD OF TECHNOLOGY

Aspects of the disclosure relate to generating user interfaces for source applications.

BACKGROUND OF THE DISCLOSURE

In today's digital landscape users often deal with an overwhelming amount of information. Users may utilize multiple applications. Each application may display fields and functionalities to the user. The fields and functionalities of each application may vary. The locations in which the fields and functionalities are displayed or accessed may vary. The large number of fields and functionalities and variations of the fields and functionalities between applications may lead to inefficiency and confusion for the user.

Conventionally, a development team may limit the fields and functionalities of an application. However, limiting the fields and functionalities may adversely affect certain users who require those fields. Developing separate instances of the application for each user may be prohibitively expensive. Having a team of developers change fields and functionalities of the application based on a user request and developing needs of the user may take a long time and cause confusion to other users.

Users may serve varying functions within an organization. The functions within the organization may require accessing varying information fields within the organization's application. Each user may require access to different fields within the application based on their role and priority status within the organization. Currently there is no means for dynamically changing the user interface of the application based on role and priority status.

After becoming familiar with the application, a user may desire for a field to be added, removed or changed. Currently there is no means for dynamically changing the user interface of the application based on a user preference.

It would be desirable to provide an intelligent method to dynamically control a user interface of an application based on a user's role and priority status. It would further be desirable to provide an intelligent method to dynamically control a user interface of an application based on the user's preferences.

SUMMARY OF THE DISCLOSURE

A method for dynamically generating a user interface ("UI"), the UI for use with a source application is provided. The method may include tagging each field within the source application to one or more of a plurality of priority levels. The method may include identifying a user accessing the source application. The user may access the source application via a user device. The user device may include a graphical user interface ("GUI"). The method may include using a look-up chart stored in a database to identify a user priority level of the user and a plurality of historic pattern behaviors of the user. The method may include generating the UI on the GUI based on the user priority level and the plurality of historic pattern behaviors of the user. The method may include dynamically monitoring the user's usage of the source application. The method may include adjusting, in a first adjusting, the UI based on the usage. The user priority level may be one of the plurality of priority levels. The generating the UI may include adding each field tagged to the user priority level the UI and adding each field associated with the historic pattern behaviors of the user to the UI. The first adjusting may include adding, removing and changing at least one field generated on the UI.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
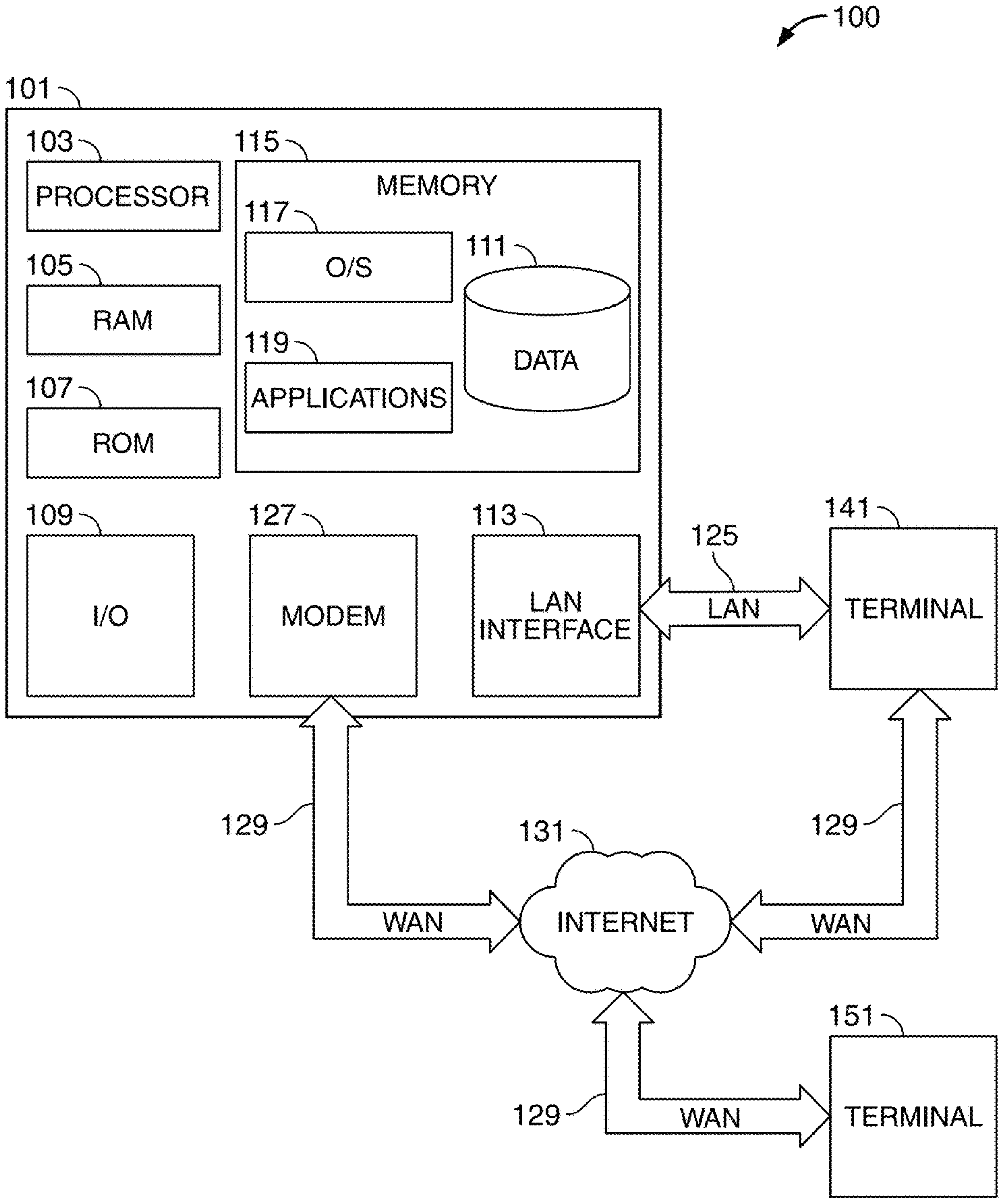
FIG. 1 shows an illustrative system in accordance with principles of the disclosure.

A technology according to the disclosure can significantly increase ease of use of applications. Such a technology could significantly improve productivity for users.

Organizations may require employees to utilize a source application to complete tasks. There may be different roles within the organization. The different roles may include different priority levels. The different roles may require using different functionalities and fields within the source application to accomplish the tasks. Different roles may include fraud evaluation, claim processing, sales, customer service etc.

A user may access the source application via a user device. The user device may include any device with a graphical user interface ("GUI"). The user device may display a UI on the GUI. The UI may be generated by the source application. The source application may dynamically generate the UI based on the user accessing the source application. The UI may be generated by a model-viewer-controller system. The model-viewer-controller system may include an artificial intelligence ("AI") engine. The UI may be generated based on information determined by the AI engine. The AI engine may generate the UI based on the priority level of the user, the user's historic pattern behaviors and any other suitable factors. The priority level of the user may indicate which fields the user has access to.

The methods may include tagging each field within the source application. The fields may be tagged to one or more of a plurality of priority levels. For example, the AI engine may tag one field to all the priority levels and tag a different field to only the highest priority level.

The methods may include identifying a user accessing the source application. The user may be identified while attempting to access the source application. The user may be identified via a user's device identity. The user may be identified via a user's login credentials. The user may be identified via a user login network. The user may be associated with the user's device identity, login credentials and/or login network.

A database may store the associations. The source application may store the database. The database may be separate from the source application. The source application may communicate with the database to identify the user. The source application may use a look-up chart within the database to identify the user.

Each user may be associated with a predetermined priority level. Administrators of the source application may assign the priority level to the users. The organization may assign the priority level to the user. Predetermined factors such as a position within the organization, a number of years worked at the organization etc and any other suitable factors may impact the priority level of the user.

The database may store the user's associated priority level. The source application may communicate with the database to retrieve the user's priority level, after identifying the user. When a user is not associated with a priority level, the lowest priority level may be given to the user.

The user may be associated with a plurality of historic pattern behaviors. The plurality of historic pattern behaviors may include information relating to a user's preferences for the UI. For example, the user may desire a certain field positioned in a certain location on the GUI. The database may store the historic pattern behaviors. The source application may communicate with the database to retrieve the user's historic pattern behaviors.

The source application may generate the UI based on the priority level of the user. The source application may generate the UI based on the historic pattern behavior of the user. The source application may generate all fields tagged to the priority level of the user. The source application may generate all fields associated with the user's historic pattern behavior.

The priority levels may relate to different roles within the organization. Each priority level may be associated with a specific role. Each priority level may be associated with specific fields relating to the role associated with the respective priority level. A user may have more than one role within the organization. A user may have more than one priority level within the organization.

The source application may generate fields within a user's UI based on predefined rules. The predefined rules may be related to time, location or customized guidelines. In this way each user may have a customized UI within the source application.

The source application may include a model-viewer-controller architecture. The model-viewer-controller may be broken down into three categories. The categories may include model, viewer and controller categories. Each category may include components. The model category may include the data and business logic information. The viewer category may include the UI elements and characteristics and components with which to generate the UI. The controller category may be located between the model and viewer. The controller may manipulate information from the model to the viewer and from the viewer to the model. The controller may extract information from the viewer to send to the model. The controller may extract information from the model to send to the viewer. The controller category may include the AI engine.

The application may include a dynamically generated UI controller engine. The dynamically generated UI controller engine may be in communication with the model-viewer-controller. The user may access the UI through the dynamically generated UI controller engine. The dynamically generated UI controller engine may receive user data and transfer it to the model-viewer-controller. The data may include information used to identify the user. The information may include the user's network, device ID, login credentials and any other suitable information relating to the user's identity.

The model-viewer-controller may be in communication with a generative AI UI generation engine. The controller component may include the generative AI UI generation engine. The generative AI UI generation engine may be a separate component. The generative AI UI generation engine may generate the UI using generative AI. The generative AI may receive an input from the controller. The input may be for example "create a UI with the following fields". The generative AI may generate the UI using complex algorithms to fit each field within the UI in an easily accessible manner.

The source application may adjust the UI automatically.

The source application may adjust the UI dynamically. The controller component may dynamically monitor the user's usage of the source application via the viewer component. The usage may include the number of times each field is used, the number of times each page is accessed, the time spent on each page, the time spent in each field, cursor movements, keyboard strokes, user searches, information typed by the user or any other suitable information that can be extracted from the user interacting with the source application.

Based on the monitored usage, the model-viewer-controller may adjust the UI of the source application dynamically. The controller in real-time may identify fields of the UI which the user may desire to adjust based on the usage and the historic pattern behaviors of the user. The AI engine may analyze the usage to identify the fields. The AI engine may use algorithms that search the usage for keywords or preprogrammed sequences that suggest the user desires to adjust a specific field. When the AI engine has determined that there is sufficient evidence to suggest an adjustment, the AI engine may communicate this adjustment to the controller.

The adjusting may include adding, removing and/or changing at least one field on the UI. The controller may send the adjustment as an input to the generative AI UI generation engine to generate an adjusted UI. The controller may send the generated adjusted UI to the viewer. The viewer may display the generated adjusted UI on the user device via the GUI.

The viewer may show the adjustment to the user. The viewer may highlight the adjustment. The viewer may prompt the user to accept or reject the adjustment. The viewer may prompt the user to make changes to the adjustment. The user may be notified when an adjustment is made. The viewer may integrate the adjustment into the UI without notifying the user. The viewer may integrate the adjustment into the UI without notifying the user when a confidence level of the AI engine is above a threshold confidence level. The confidence level of the AI engine may be determined based on the closeness of the usage/historic pattern behaviors to algorithms defined within the AI engine.

The historic pattern behaviors of the user may be updated to include the usage of the user's session and any adjustments made to the UI. The updated historic pattern behaviors may be stored in the database. The historic pattern behaviors may be updated at predetermined intervals. The predetermined intervals may include 2 hours, 4 hours, 8 hours, 1 day, 2 days or any suitable number of hours/days.

The source application may adjust the UI via a user request.

The user may submit a request to a server for the source application to adjust the UI. The request may be in plain language. The request may utilize computer code. The server may send the request to a response parser module. The response parser module may include an AI engine. The response parser module may include a natural language processing ("NLP") algorithm. The AI engine may include the NLP. The NPL may parse the plain language request to determine a user intent. The NLP may place the plain language request in uniform terms understood by the source application.

The response parser module may send the parsed response to a field extractor module. The field extractor module may determine which fields in the source application the response is directed to. The field extractor module may be included in the AI engine to process the parsed response. The AI engine may use the uniform terms to determine which fields the response is directed to.

The field extractor module may send the fields to a controlled field tagging module. The AI engine may include the controlled field tagging module. The controlled field tagging module may tag the desired fields to respective levels. The respective levels may correspond to different priority levels. The respective levels may correspond to user preferences. The respective levels may correspond to a mix of priority levels, user preferences, user roles and predefined rules. The controlled field tagging module may utilize UI page context in the tagging. The UI page context may be related to a user page. The user may be prompted to submit a user page when submitting a user request.

The AI engine may determine the user page based on the uniform terms and fields. The AI engine may determine the user page based on the usage of the user. The AI engine may analyze the uniform terms, page context to determine a user intent. The user intent may relate to the type of adjustment desired by the user. The adjustment may include an addition, deletion and/or change to one or more fields in the UI.

The controlled field tagging module may tag the fields to the respective levels via a system based approach and a user based approach. The system based approach may include tagging the fields based on a user's network, a user's priority level and/or predefined rules developed by the source application. The predefined rules may relate to time and location specific rules. The user based approach may include tagging the fields based on a user's role, historical cognitive mapping, behavioral pattern analysis and/or the user's intent.

The controlled field tagging engine may send the tagged fields to a controlled multi-level visual generator module. The controlled multi-level visual generator module may design and dynamically generate an adjustment to the UI based on the tagged fields and desired adjustment. The controlled multi-level visual generator module may generate the UI and include each level with respective fields. Each level may be displayed to the user in separate rows, columns, quadrants or any other suitable sectioning manner. Each level may include the fields tagged to it by the controlled field tagging module.

The controlled multi-level visual generator module may send the UI to the viewer component. The viewer may show the adjustment. The viewer may highlight the adjustment. The viewer may prompt the user to accept or reject the adjustment. The viewer may prompt the user to make changes to the adjustment. The historic pattern behaviors of the user may be updated to include any adjustments made to the UI.

The controlled multi-level visual generator module may receive data extracted from the current UI. The controlled multi-level visual generator module may include a dynamic content generator module. The dynamic content generator module may generate the tagged fields. The controlled multi-level visual generator module may include an adaptive widget generator. The adaptive widget generator may construct the mechanism for the user to interact with the fields within the UI. The controlled multi-level visual generator module may include a behavior analysis and predictive interaction module. The behavior analysis and predictive interaction module may analyze the user's past behavior and preferences to design the fields according to the user's preferences.

The controlled multi-level visual generator module may include a controlled multi-level UI structure module. The controlled multi-level UI structure module may generate the fields in a multi-level structure. For example, each level may correspond to a different priority level. The user may have access to multiple priority levels. The UI may be show each priority level separately. For example, priority level 1 fields may be shown in a first row on the UI, priority level 2 fields may be shown in a second row on the UI and priority level 3 fields may be shown in a third row.

The controlled multi-level visual generator module may include a submission validation engine. The submission validation engine may validate that the generated fields can integrate with the UI and user device.

The controlled multi-level UI structure module may include a hierarchical context management module. The hierarchical context management module may organize the fields into their respective priority levels. The controlled multi-level UI structure module may include a role based access control module. The role based access control module may control access to the priority levels based on roles, permissions and the priority level of the user. The controlled multi-level UI structure module may include a user interaction tracking module. The user interaction tracking module may dynamically track user behavior. The controlled multi-level UI structure module may include a hierarchical navigation system module. The hierarchical navigation system module may organize the priority levels into distinct rows or levels within the generated UI. The controlled multi-level UI structure module may include an integration with data sources module. The integration with data sources module may ensure the UI presents accurate and updated information to each priority level.

The following figures and associated written specifications set forth the invention in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
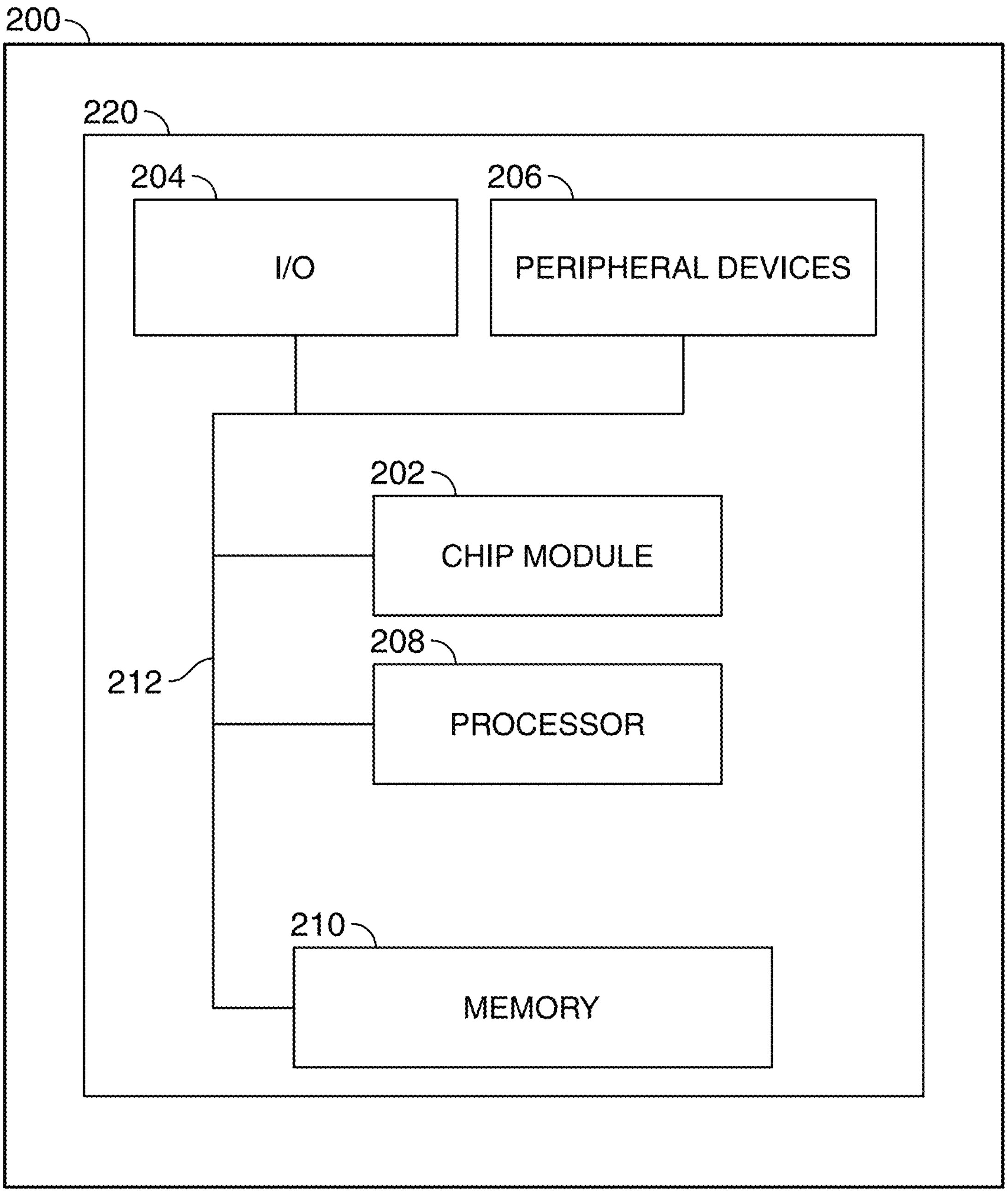
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
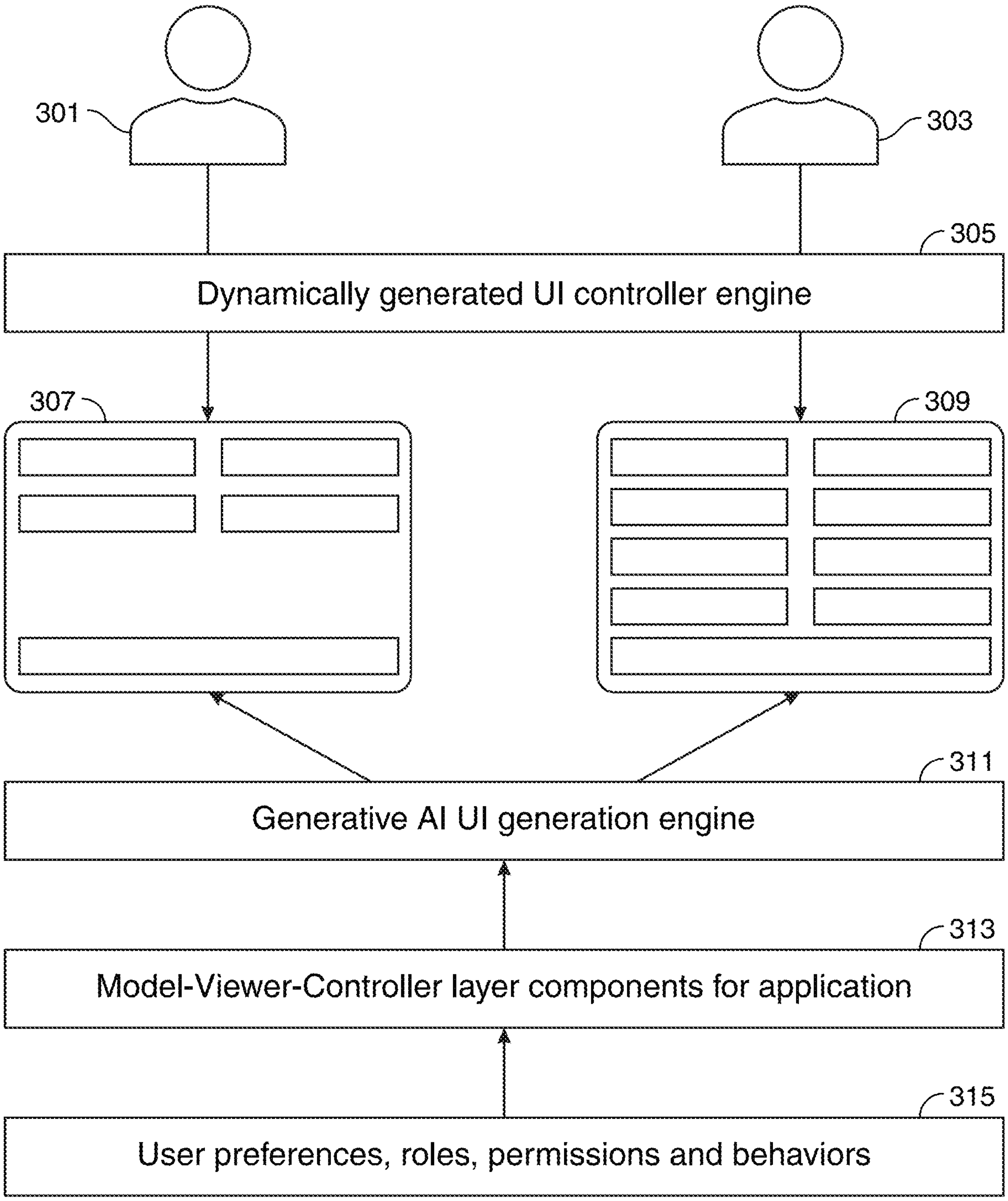
FIG. 3 shows a flow diagram in accordance with principles of the disclosure.

FIG. 3 shows a flow diagram in accordance with principles of the disclosure. First user 301 may interact with first UI 307 via dynamically generated UI controller engine 305. Second user 303 may interact with second UI 309 via dynamically generated UI controller engine 305. First UI 307 may be different from second UI 309 based on the priority level and preferences of first user 301 and second user 303.

Generative AI UI generation engine 311 may generate first UI 307 and second UI 309. Generative AI UI generation engine 311 may receive instructions for generating the UI from model-viewer-controller layer components for application 313. Model-viewer-controller layer components for application 313 may incorporate user preferences, roles, permissions and behaviors 315 into creating the instructions for generating the UI.

Figure 4:
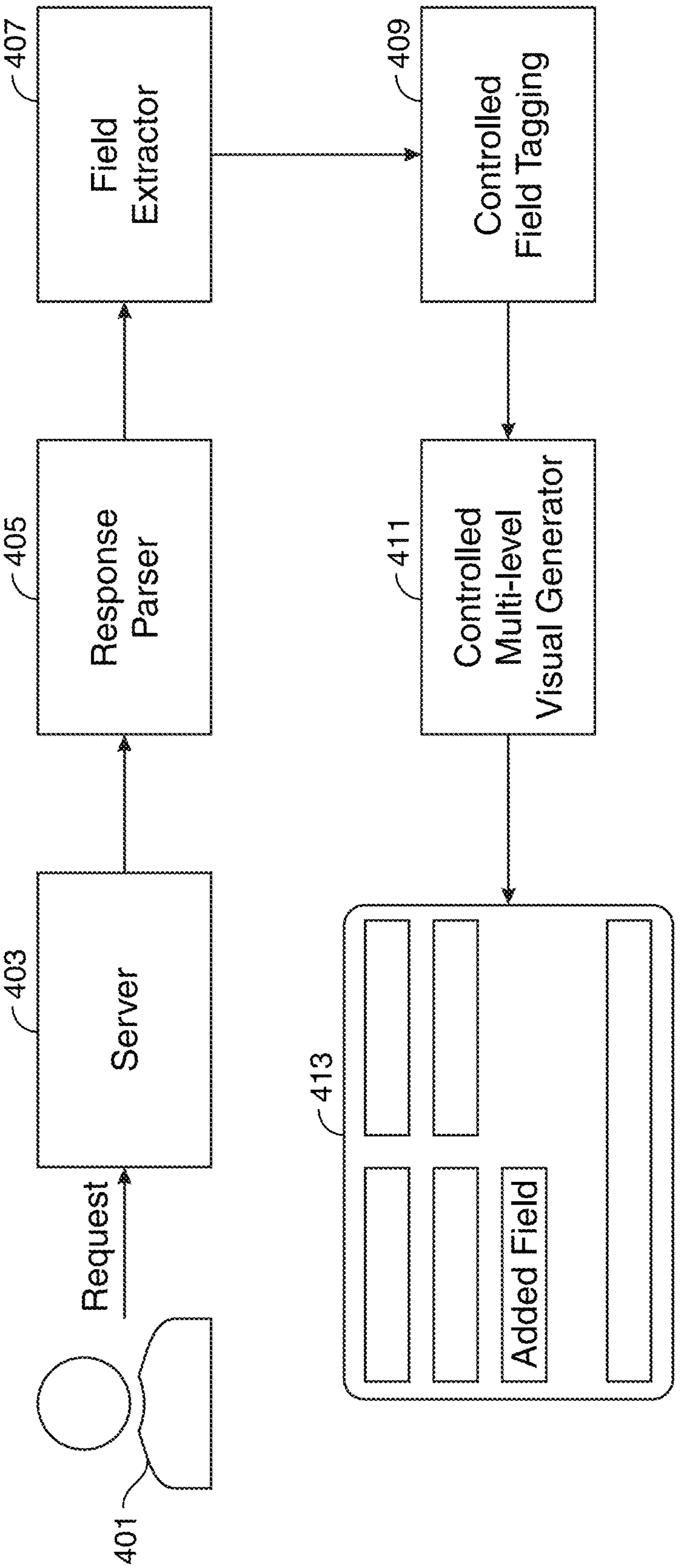
FIG. 4 shows a flow diagram in accordance with principles of the disclosure.

FIG. 4 shows a flow diagram in accordance with principles of the disclosure. User 401 may submit a request for a change in UI 413 via server 403. Server 403 may receive request from user 401. Server 403 may hand off the request to response parser 405. Response parser 405 may parse the request to put it into the correct terminology. Response parser 405 may include natural language processing algorithms. Field extractor 407 may receive the parsed response. Field extractor 407 may determine which fields in the source application the response is directed to. Field extractor 407 may be included in or include an AI engine to process the parsed response.

Field extractor 407 may send the fields to controlled field tagging 409. Controlled field tagging 409 may use the fields, UI page context and user intent (based on the parsed request) to tag the fields to respective levels. Controlled multi-level visual generator 411 may design and dynamically generate a multi-level visual representation of the changes on UI 413. User 401 may interact with UI 413 to accept the changes or further adjust the fields as desired.

Figure 5:
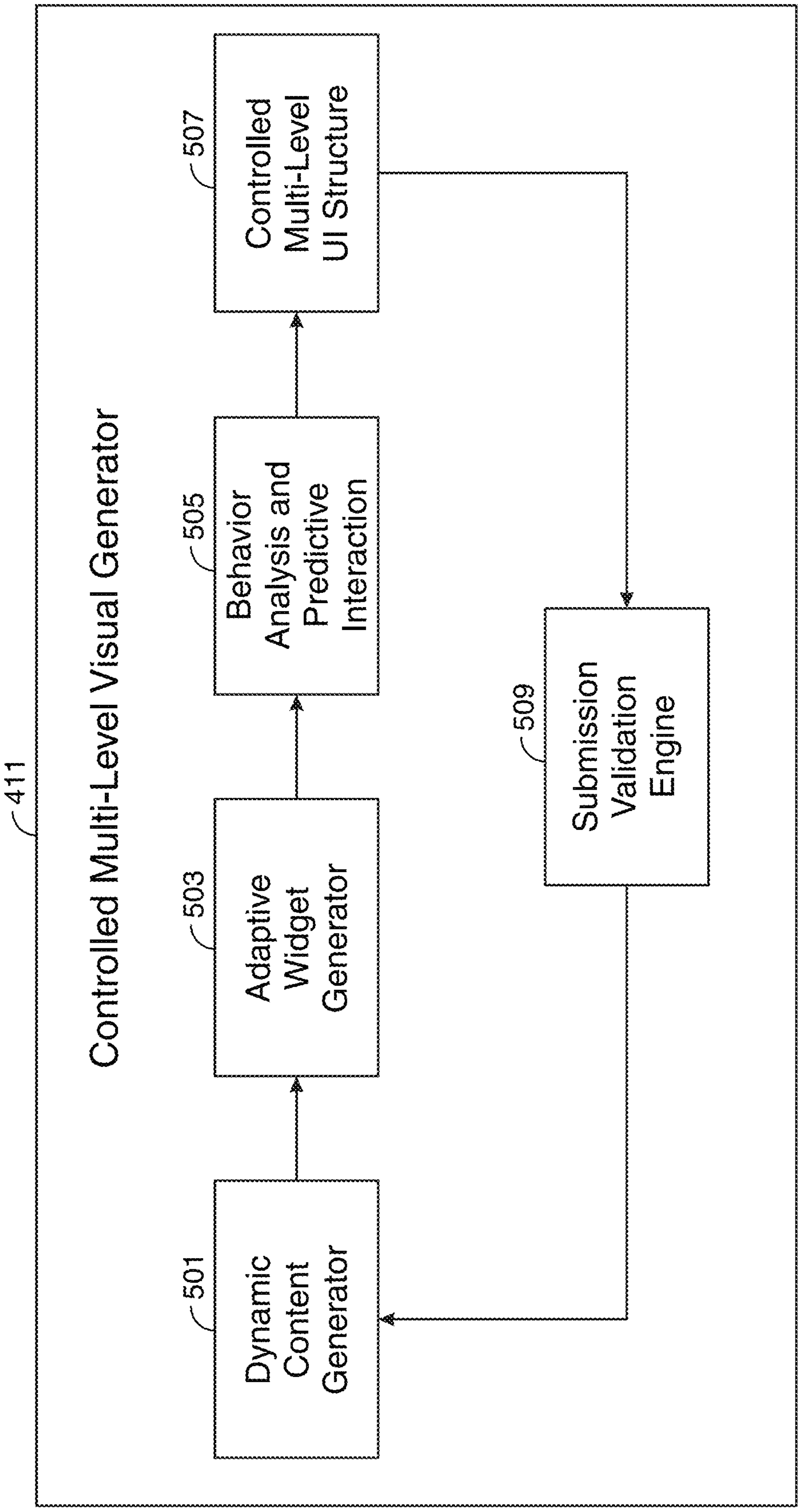
FIG. 5 shows a flow diagram in accordance with principles of the disclosure.

FIG. 5 shows a flow diagram in accordance with principles of the disclosure. Controlled multi-level visual generator 411 may receive data extracted from the current UI. Controlled multi-level visual generator 411 may include dynamic content generator 501. Dynamic content generator 501 may generate the tagged fields. Adaptive widget generator 503 may enable user interactivity of the fields within the UI. Behavior analysis and predictive interaction 505 may analyze user's past behavior and preferences to design the fields according to the user's preferences.

Controlled multi-level UI structure 507 may generate the fields in a multi-level structure. For example, each level may correspond to a respective priority level. The user may have access to multiple priority levels. The user may be shown each priority level separately on the same UI. For example, priority level 1 fields may be shown in a first row on the UI, priority level 2 fields may be shown in a second row on the UI and priority level 3 fields may be shown in a third row.

Submission validation engine 509 may validate that the generated fields can integrate with the UI and user device.

Figure 6:
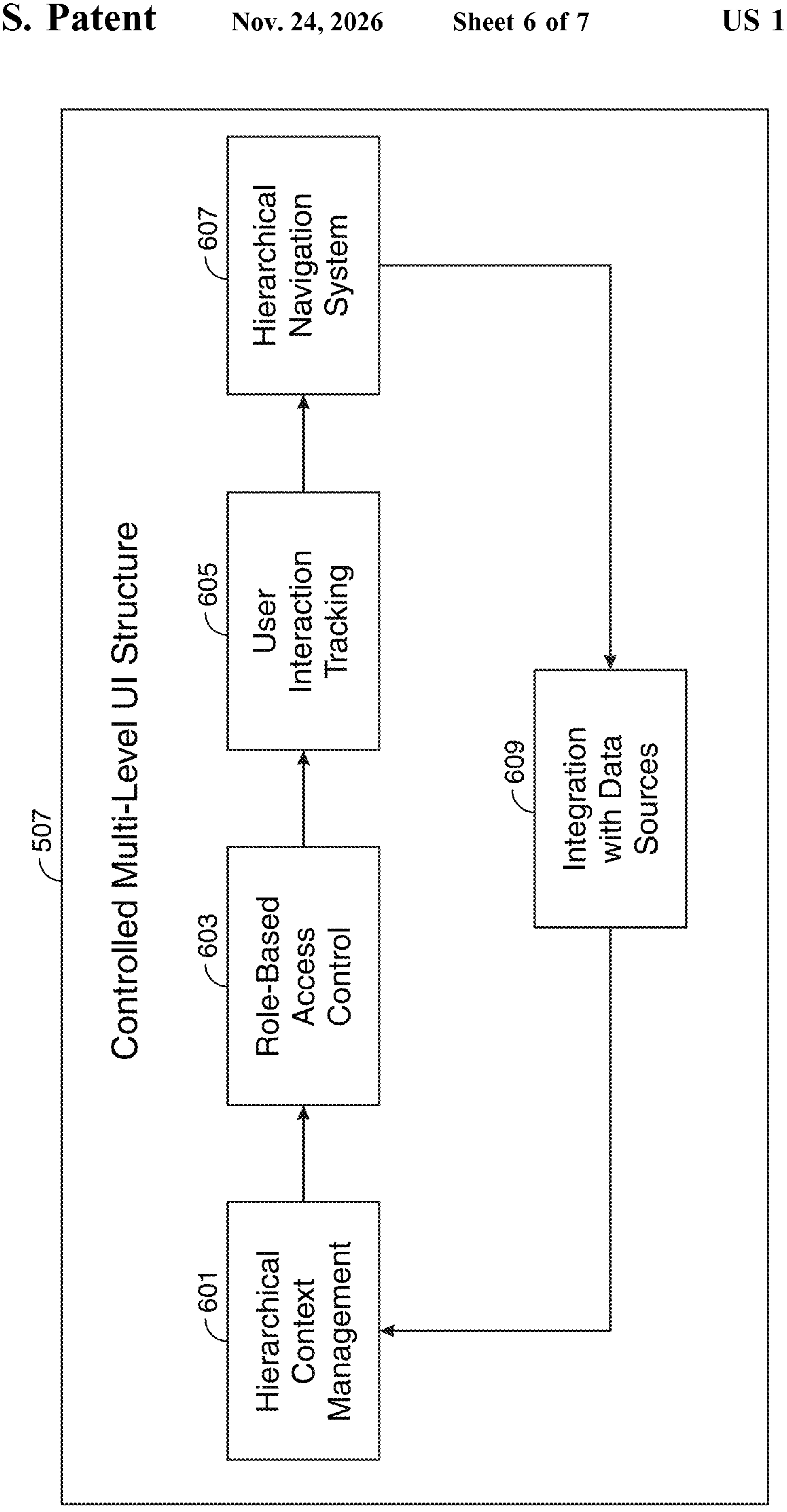
FIG. 6 shows a flow diagram in accordance with principles of the disclosure.

FIG. 6 shows a flow diagram in accordance with principles of the disclosure. Controlled multi-level UI structure 507 may include hierarchical context management 601. Hierarchical context management 601 may organize the fields into their respective priority levels. Role based access control 603 may control access to the priority levels based on roles, permissions and the priority level of the user. User interaction tracking 605 may dynamically allow system to track user behavior. Hierarchical navigation system 607 may organize the priority levels into distinct rows or levels within the generated UI. Integration with data sources 609 ensures the UI presents accurate and updated information to each priority level.

Figure 7:
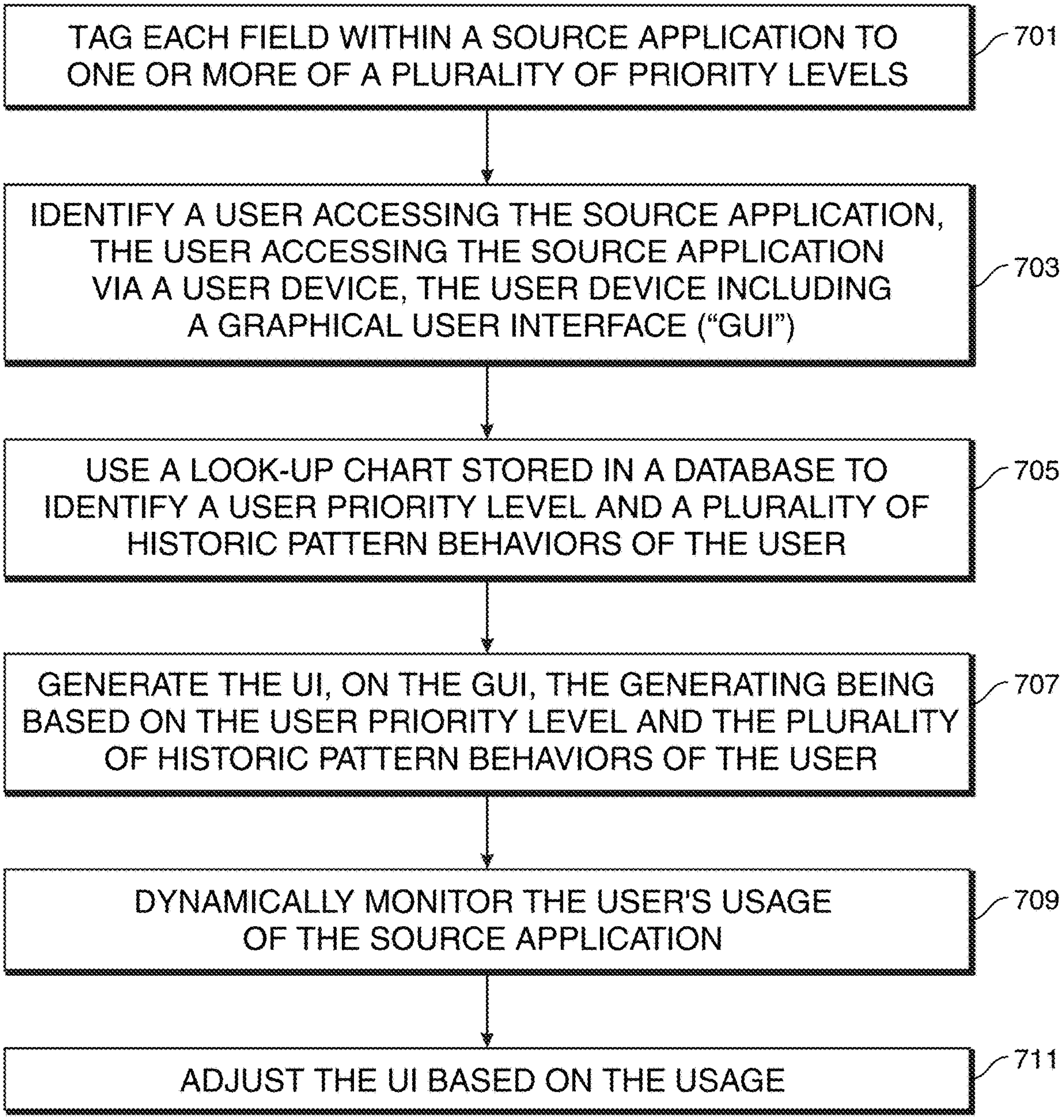
FIG. 7 shows an illustrative flowchart in accordance with principles of the disclosure.

FIG. 7 shows an illustrative flowchart in accordance with principles of the disclosure. At step 701 methods may include tagging each field within a source application to one or more of a plurality of priority levels. At step 703 methods may include identifying a user accessing the source application, the user accessing the source application via a user device, the user device including a graphical user interface ("GUI"). At step 705 methods may include using a look-up chart stored in a database to identify a user priority level and a plurality of historic pattern behaviors of the user.

At step 707 methods may include generating the UI, on the GUI, the generating being based on the user priority level and the plurality of historic pattern behaviors of the user. At step 709 methods may include dynamically monitoring the user's usage of the source application. At step 711 methods may include adjusting the UI based on the usage.

Thus, methods and apparatus for providing an intelligent method to orchestrate and control dynamically generated user interface for source application are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for dynamically generating a user interface ("UI"), the UI for use with a source application, the method comprising:

- tagging each field within the source application to one or more of a plurality of priority levels;
- identifying a user accessing the source application, the user accessing the source application via a user device, the user device including a graphical user interface ("GUI");
- using a look-up chart stored in a database to identify:
  - a user priority level of the user; and
  - a plurality of historic pattern behaviors of the user;
- generating the UI, on the GUI, the generating being based on the user priority level and the plurality of historic pattern behaviors of the user;
- dynamically monitoring the user's usage of the source application; and
- adjusting, in a first adjusting, the UI based on the usage;
- wherein:
- the user priority level is one of the plurality of priority levels;
- the generating the UI includes:
  - adding each field tagged to the user priority level to the UI; and
  - adding each field associated with the historic pattern behaviors of the user to the UI;
- the first adjusting includes adding, removing and changing at least one field generated on the UI;
- receiving a user request at a server of the source application;
- parsing the user request by an AI engine of the source application;
- identifying, by the AI engine, each field associated with the parsed user request;
- retrieving the fields associated with the parsed user request; and
- adjusting, in a second adjusting, the UI to include the retrieved fields;

wherein the identifying each field associated with the parsed user request includes:

- detecting a user page to establish a page context;
- analyzing, by the AI engine, the parsed user request and the page context to determine a user intent; and
- identifying each field associated with the user intent;
- updating the historic pattern behaviors of the user to include the second adjusting; and
- storing the updated historic pattern behaviors of the user in the database.

2. The method of claim 1 wherein the identifying the user accessing the source application comprises identifying at least one of a user's device identity, a user's login credentials or a user login network.

3. The method of claim 2 wherein when the user cannot be identified the user is assigned a lowest priority level of the plurality of priority levels.

4. The method of claim 1 wherein the first adjusting includes using an artificial intelligence ("AI") engine to analyze the usage to identify the at least one field.

5. The method of claim 1 further comprising:

- updating the historic pattern behaviors of the user to include:
  - the usage; and
  - the first adjusting; and
  - storing the updated historic pattern behaviors of the user in the database.

6. A system for dynamically generating a user interface ("UI"), the UI for use with a source application, the system comprising:

- a processor;
- a memory; and
- a non-transitory computer readable medium storing instructions that when executed by the processor:
  - tags each field within the source application to one or more of a plurality of priority levels;
  - identifies a user accessing the source application, the user accessing the source application via a user device, the user device including a graphical user interface ("GUI");
  - uses a look-up chart stored in a database to identify:
    - a user priority level of the user; and
    - a plurality of historic pattern behaviors of the user;
  - generates the UI, on the GUI, the generating being based on the user priority level and the plurality of historic pattern behaviors of the user;
  - monitors dynamically the user's usage of the source application;
  - adjusts, in a first adjusting, the UI based on the usage;
- wherein:
- the user priority level is one of the plurality of priority levels;
- the generating the UI includes:
  - adding each field tagged to the user priority level to the UI; and
  - adding each field associated with the historic pattern behaviors of the user to the UI; and
- the first adjusting includes adding, removing and changing at least one field generated on the UI;
- wherein the instructions when executed by the processor further comprise:
- receiving a user request at a server of the source application;
- parsing the user request by an AI engine of the source application;
- identifying, by the AI engine, each field associated with the parsed user request;
- retrieving the fields associated with the parsed user request;
- adjusting, in a second adjusting, the UI to include the retrieved fields;

wherein the identifying each field associated with the parsed user request includes:

- detecting a user page to establish a page context;
- analyzing, by the AI engine, the parsed user request and the page context to determine a user intent; and
- identifying each field associated with the user intent;

updating the historic pattern behaviors of the user to include the second adjusting; and storing the updated historic pattern behaviors of the user in the database.

7. The system of claim 6 wherein the identifying the user accessing the source application comprises identifying at least one of a user's device identity, a user's login credentials or a user login network.

8. The system of claim 7 wherein when the user cannot be identified the user is assigned a lowest priority level of the plurality of priority levels.

9. The system of claim 6 wherein the first adjusting includes using an artificial intelligence ("AI") engine to analyze the usage to identify the at least one field.

10. The system of claim 6, wherein the instructions when executed by the processor further comprises:

updating the historic pattern behaviors of the user to include:

the usage; and the first adjusting; and storing the updated historic pattern behaviors of the user in the database.

11. A method for dynamically generating a user interface ("UI"), the UI for use with a source application, the method comprising:

tagging each field within the source application to one or more of a plurality of priority levels;

identifying a user accessing the source application, the user accessing the source application via a user device, the user device including a graphical user interface ("GUI");

using a look-up chart stored in a database to identify:

a user priority level of the user; and a plurality of historic pattern behaviors of the user;

generating the UI, on the GUI, the generating being based on the user priority level and the plurality of historic pattern behaviors of the user;

dynamically monitoring the user's usage of the source application; and adjusting, in a first adjusting, the UI based on the usage; wherein:

the user priority level is one of the plurality of priority levels;

the generating the UI includes:

adding each field tagged to the user priority level to the UI; and adding each field associated with the historic pattern behaviors of the user to the UI; and the first adjusting includes:

adding, removing and changing at least one field generated on the UI; and using an artificial intelligence ("AI") engine to analyze the usage to identify the at least one field;

receiving a user request at a server of the source application;

parsing the user request by an AI engine of the source application;

identifying, by the AI engine, each field associated with the parsed user request;

retrieving the fields associated with the parsed user request;

adjusting, in a second adjusting, the UI to include the retrieved fields;

wherein the identifying each field associated with the parsed user request includes:

detecting a user page to establish a page context;

analyzing, by the AI engine, the parsed user request and the page context to determine a user intent; and identifying each field associated with the user intent;

updating the historic pattern behaviors of the user to include the second adjusting; and storing the updated historic pattern behaviors of the user in the database.

* * * * *